3,068,121
PRESSURE SENSITIVE ADHESIVE TAPE AND PAPER BACKING ELEMENT IMPREGNATED WITH AN ACRYLIC ESTER COPOLYMER AND A WATER-DISPERSIBLE ALDEHYDE RESIN
Joseph R. Weschler, New Brunswick, N.J., assignor to Johnson & Johnson, a corporation of New Jersey
Filed Sept. 29, 1953, Ser. No. 764,104
10 Claims. (Cl. 117—122)

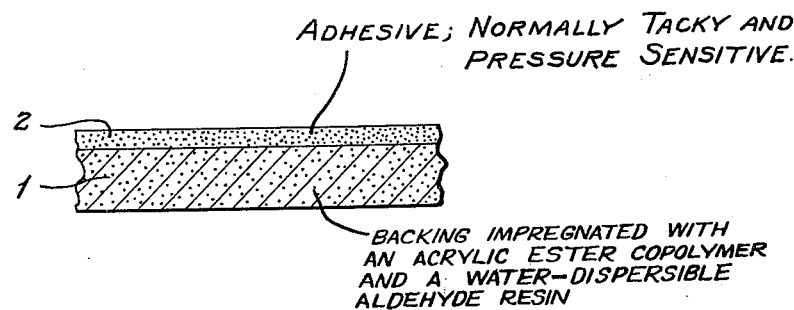

This invention relates to improved backings for pressure-sensitive tapes. More particularly this invention relates to latex-based compositions for impregnating papers and other fibrous webs of similar character, and to methods for producing improved backings for pressure-sensitive tape utilizing said latex-based compositions and the products of such method.

Paper-backed, normally tacky and pressure-sensitive adhesive tapes, particularly those used for masking purposes, should have a combination of satisfactory elongation, flexibility, edge tear, wet and dry tensile strength and delamination resistance. By delamination resistance is meant the resistance offered by the backing to being split into two layers by forces perpendicular to the sheet. By edge tear is meant the resistance to starting a tear at the edge of a tape as one might encounter in masking sharply curved surfaces. Flexibility, wet tensile strength and elongation have the conventional meanings associated with them. In the case of masking tapes, the product must have good elongation, flexibility and edge tear in order that the tape be curved to mask curved lines without tearing during application.

Paper backings for use in pressure-sensitive tapes can be unified or strengthened internally by treatment of the paper with aqueous colloidal suspensions of elastomeric polymers. The sheets are impregnated in amounts sufficient to deposit susbtantial rubbery polymer solids in the web to bond the fibers thereof to a degree sufficient to lend the tape high internal strength and resistance to delamination particularly under humid conditions when in tape form.

In the treatment of paper webs with colloidal suspensions of elastomeric polymers, however, it has been generally found that the edge tear, elongation and flexibility of the sheet suffered considerably whenever ingredients were incorporated in the latex for the purpose of improving the tensile strength and delamination resistance of the product. Obviously, a balancing of the characteristics of the tape is necessary to obtain a successful commercial product, and increasing one property to the severe detriment of others is not advantageous.

Accordingly, it is an object of this invention to provide a unified paper web suitable for use as a backing element for a normally tacky and pressure-sensitive adhesive sheet wherein the backing has the characteristics of improved delamination resistance (wet and dry) and tensile strength (wet and dry) and yet adequate flexibility, elongation and edge tear.

It is an additional object of this invention to provide a masking tape having the aforementioned properties.

It is a further and more specific object of this invention to provide an impregnant composition for saturating paper webs to form backing elements with balanced properties of edge tear, flexibility, elongation, tensile strength and delamination resistance.

It is a further object of this invention to provide a novel method for producing unified paper web and masking tape having the aforementioned characteristics.

These and other objects of the invention will become apparent when consideration is given to the hereinafter detailed description of this invention.

In accordance with this invention an improved paper sheet is obtained when impregnated with a mixture of an alkyl acrylate copolymer of the type hereinafter described and a minor amount of a water dispersible aldehyde resin. The alkyl acrylate copolymers useful in this mixture are copolymers of an alkyl acrylate and a second monomer selected preferably from the group consisting of an acrylic acid such as acrylic acid methacrylic acid, ethacrylic acid and the like; an acrylamide; a vinyl pyridine; a dialkyl amino alkyl ester of acrylic acid or a substituted acrylic acid; a glycidyl alkyl ester of an acrylic acid; and an allyl substituted melamine such as N-allylmelamine N,N'-diallyl-melamine, N-allyl-N-benzylmelamine and N-allyl-N'-benzylmelamine.

The water dispersible aldehyde resins used in this invention are selected from the group consisting of phenol-aldehyde resins, melamine-aldehyde resins, and urea-aldehyde resins, and are preferably the formaldehyde resins. The terms phenol, melamine, and urea, are used generically to cover all suitable substituted analogues which form water soluble or dispersible resins. The term water dispersible as used herein means a resin which is soluble or dispersible in water. The urea-formaldehyde and melamine-formaldehyde resins have the further advantage of being particularly resistant to discoloration which usually accompanies exposure to elevated temperatures, light and air.

It has been found that the objects set forth as desirable in this invention may be accomplished by using amount of modifying resins in a range from nearly 0.1 to 25% of the total composition. However the preferred ranges of additive resins needed to produce impregnated backings with sought-after properties of high delamination resistance, a high degree of wet tensile strength and adequate tear strength have been found to vary somewhat with the particular modifying resin used. Satisfactory impregnated backings possessing delamination resistance and wet tensile strength have been obtained using the following preferred amounts of modifying resins based by weight on the total composition:

|  | Percent |
|---|---|
| Phenol-formaldehyde resins | 0.5–10 |
| Urea-formaldehyde resins | 1–8 |
| Melamine-formaldehyde resins | 1–8 |

Larger amounts of modifying resins may be added to give further increases in delamination resistance and wet tensile strength but with an associated loss in edge-tear resistance and flexibility.

It is usually found convenient to modify the acrylate impregnant with a butadiene-styrene type latex in order to improve the anchorage between the impregnated paper and the normal pressure-sensitive adhesive such as pale crepe, GR–S, polyvinyl ether, or polyisobutylene base adhesive used thereon. In addition to improving the anchorage, the use of butadiene-styrene latices results in an impregnant of reduced cost. The preferred monomer ratio of the butadiene-styrene latex used in this invention is from 50:50 to 40:60 although other ratios such as 70:30 may also be used. The amount of butadiene-styrene latex used is usually from 0–5% but up to 75% of the total composition may be used for a particularly low cost backing.

An example of a suitable acrylate ester copolymer latex is a copolymer of ethyl acrylate and methacrylic acid. Such a latex is sold commercially as "Rhoplex B–15." It is essentially a polyethylacrylate resin which contains approximately 2% by weight of an acrylic acid group.

In the examples given hereinbelow:

Durez 14798 is a water-soluble thermosetting phenol-formaldehyde resin supplied as a 65% solids syrup in water.

Rhonite R–2 is an 85% solids liquid water-soluble thermosetting monomeric urea formaldehyde resin supplied in water.

Triton X-200 is the sodium salt of an alkyl aryl polyester sulfonate wetting agent supplied as 28% active solution in water. It has the following structure:

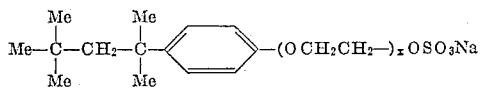

Aerotex Resin M-3 is a water-soluble thermosetting melamine formaldehyde resin supplied as an 80% solids syrup in water with a pH of 8.5 to 9.0.

Schenectady 1505A resin is a water-soluble heat advancing resorcinol formaldehyde resin. It is supplied as 80% solids solution in water at a pH of 2-3. This resin was diluted as follows before added to the latex system: 125 grams Schenectady 1505A, 30 grams ammonia (26-29%), 845 grams water.

The following examples are given by way of illustration and not by way of limitation. Further embodiments of the present inventive concept will be readily deduced therefrom and when read in conjunction with the teachings contained in the specification.

EXAMPLES

Each of the modifying resins will be added in various amounts to an impregnating mixture which in turn is worked into a paper suitable for use as a backing for a pressure-sensitive adhesive tape by conventional means. The properties of backing material so treated are then compared with a control sample, the impregnating composition for which was not modified by the use of the resins of the invention.

*Example I*

A 30-lb. creped kraft saturating paper was saturated with 75% of its weight (dry basis) with a mixture of 75% acrylate latex (Rhoplex B-15), 24.5% of a 40/60 butadiene-styrene latex, and .5% antioxidant. The impregnation was accomplished with conventional squeeze roll equipment, and the wet sheet dried and cured 1 minute at 370° F.

*Example II*

A 30-lb. creped kraft saturating paper was saturated with 70% of its weight (dry basis) with a mixture of 74% acrylate latex (Rhoplex B-15), 23.5% of a 40/60 butadiene-styrene latex, 2% of a phenol-formaldehyde resin (Durez 14798) and .5% antioxidant. Impregnated paper was dried and cured 1 minute at 370° F.

*Example III*

A 30-lb. creped kraft saturating paper was saturated with 77% of its weight (dry basis) with a mixture of 70% acrylate latex (Rhoplex B-15), 19.5% of a 40/60 butadiene-styrene latex, 10% of a phenol-formaldehyde resin (Durez 14798) and .5% antioxidant. The impregnated paper was dried and then cured 1 minute at 370° F. Results of these examples are tabulated below:

|  | Example | Percent phenolic resin | Delam. resist., oz. | Wet tensile, #/in. | Edge tear, #/in. |
|---|---|---|---|---|---|
| Control | I | 0 | 50 | 9.2 | 2.6 |
| Invention | II | 2 | 70 | 12.8 | 2.8 |
| Do | III | 10 | 81 | 15.3 | 2.3 |

It will be noted that as the impregnating composition is modified by the addition of phenol-formaldehyde resin the treated backing becomes more delamination-resistant and its wet tensile strength is increased. The edge-tear properties remain relatively unimpaired though slightly diminished in the instance where the amount of modifying resin used is at the upper end of the preferred range.

*Example IV*

A 30-lb. creped kraft saturating paper was impregnated with 84% of its weight (dry basis) with a mixture of 72% of an acrylate latex (Rhoplex B-15), 25% of 50/50 butadiene-styrene latex, 2% of a urea-formaldehyde resin (Rhonite R-2), .5% of a catalyst, and .5% antioxidant. The sheet was dried and cured 1 minute at 370° F.

*Example V*

A 30-lb. creped kraft saturating paper was impregnated with 83% of its weight (dry basis) with a mixture of 70% of an acrylate latex (Rhoplex B-15), 24% of a 50/50 butadiene-styrene latex, 5% of a urea-formaldehyde resin (Rhonite R-2), .5% of a catalyst, and .5% antioxidant. The sheet was dried and cured 1 minute at 370° F.

*Example VI*

A 30-lb. creped kraft saturating paper was impregnated with 84% of its weight (dry basis) with a mixture of 65% of an acrylate (Rhoplex B-15), 24% of a 50/50 butadiene-styrene latex, 5% of a urea-formaldehyde resin, 1% of a catalyst, and .5% antioxidant. The sheet was dried and cured 1 minute at 370° F.

*Example VII*

A 30-lb. creped kraft saturating paper was impregnated with 84% of its weight (dry basis) with a mixture of 60% of an acrylate latex (Rhoplex B-15), 24% of a 50/50 butadiene-styrene latex, 14% of a urea-formaldehyde resin, 1% of a catalyst, and .5% antioxidant. The following table gives the results of these examples:

|  | Example | Percent urea form. resin | Delam. resist., oz. | Wet tensile, #/in. | Edge tear, #/in. |
|---|---|---|---|---|---|
| Control | I | 0 | 50 | 9.2 | 2.6 |
| Invention | IV | 2 | 68 | 10.5 | 2.6 |
| Do | V | 5 | 70 | 10.6 | 2.1 |
| Do | VI | 9 | 73 | 11. | 1.4 |
| Do | VII | 14 | 73 | 12.5 | .9 |

An improvement similar to that obtained using phenol-formaldehyde resin is seen to have resulted from the use of varying amounts of urea-formaldehyde resin as the modifying resin in the impregnating composition with which a fibrous backing material has been treated. The delamination resistance and wet tensile strength increase as the amount of modifying resin increases, even when such amount is in substantial excess of the upper end of the preferred range. It is concern for preserving edge tear resistance which dictates the limiting of the preferred range. The examples demonstrate the loss of edge tear resistance when the modifying resins are added in amounts beyond a certain maximum but these same examples, outside the preferred range, may be suitable for many applications where high tear strength is not critical.

*Example VIII*

A 30-lb. creped kraft saturating paper was impregnated with 70% of its weight (dry basis) with a mixture of 70% of an acrylate latex (Rhoplex B-15), 24% of a 40/60 butadiene-styrene latex, 5% of a melamine-formaldehyde resin (Aerotex M-3), 1% of a catalyst and .5% antioxidant. The sheet was dried and cured 1 minute at 370° F.

*Example IX*

A 30-lb. creped kraft saturating paper was impregnated with 68% of its weight (dry basis) with a mixture of 65% of an acrylate latex (Rhoplex B-15), 24% of a 40/60 butadiene-styrene latex, 10% of a melamine-formaldehyde resin (Aerotex M-3), 1% of a catalyst, and .5% antioxidant. The sheet was dried and cured 1 minute at 370° F. Results of Examples VIII and IX are given in the following table:

| Example | | Percent melamine formaldehyde resin | Delam. resist., oz. | Wet tensile, #/in. | Edge tear, #/in. |
|---|---|---|---|---|---|
| Control | I | 0 | 50 | 9.2 | 2.6 |
| Invention | VIII | 5 | 62 | 10.8 | 2.0 |
| Do | IX | 10 | 75 | 12.1 | .8 |

The general pattern established by the results of examples wherein phenol-formaldehyde and urea-formaldehyde were used as modifying resins in impregnating compositions for fibrous backings for adhesive tapes and sheets is further borne out by the results obtained using melamine-formaldehyde resin as the modifier. The delamination resistance and wet tensile strength of the materials impregnated with melamine-formaldehyde is improved, while at a certain point in the addition of the modifying resin the resistance to edge tear begins to diminish with the increase in the amount of said modifying resin used.

The following examples show the use of the additives of the present invention on latices which do not include butadiene-styrene latex.

A 30-lb. creped kraft saturating grade paper is impregnated with varying amounts of Rhoplex B–15. A second series of tapes were made up by impregnating the same type 30 lb. creped graft saturating grade paper with Rhoplex B–15 modified with 5% Durez 14798 (based on solids weight). After impregnation and drying, the samples were heated for 5 minutes at 320° F. Delamination and wet tensile results are as follows:

| Example | Percent impregnation | Delam. resist., ozs. | Wet tensile strength, lbs. |
|---|---|---|---|
| Control X—Rhoplex B–15 | 114 | 48 | 11.5 |
| Control XI—Rhoplex B–15 | 72 | 41 | 10.0 |
| Invention XII—Rhoplex B–15 | 101 | 70 | 14.2 |
| Invention XIII—Durez 14798 | 62 | 54 | 11.1 |

It will be noted that both the delamination resistance and wet tensile strength are improved in the cases where the ethylacrylate resin is modified by the addition of phenol-formaldehyde resin. This improved result is obtained despite the lesser amounts of the modified adhesive composition impregnated into the backings.

Further examples are now set forth to demonstrate the comparative delamination resistance and wet tensile strength of a 30-lb. flat bleached kraft saturating grade paper by treating it with impregnating agents of the invention, and with impregnating agents of the prior art and further heat treating the impregnated paper for about 5 minutes at 320° F.

Latex A was a copolymer composed of 86.5% by weight ethyl acrylate and 13.5% glycidyl methacrylate. It was prepared as follows:

A 500 ml., round bottom, three necked flask was fitted with a nitrogen line, stirrer, thermometer, and reflex condenser and placed in a 60° water bath controlled by a thermostat. Nitrogen was allowed to bubble in as the 150 ml. of distilled water and 4 g. of Tween 80 were heated up to 60°. After 30 minutes of deaeration, 0.05 g. portions each of potassium persulfate and sodium bisulfite were added and the monomer mixture of 65 ml. of washed ethyl acrylate and 10 ml. of washed glycidyl methacrylate was allowed to start dropping into the stirred system. After 30 additional minutes the remaining monomer mixture was all dropped in and 0.05 g. portions of the redox initiators were again added. After another 30 minutes of reaction 0.05 g. portions of the initiators were again added. After a final 30 minutes period the reaction was stopped. The polymeric latex was found to have 29.8% solids.

Latex B is an impregnating composition based on latex A modified in accordance with this invention. Latex B contains 85 parts by weight of latex A plus 15 parts by weight (based on solid content) of the following modifying resin.

The compositions of latex A and latex B were used to impregnate the paper described above in various degrees. The delamination resistance and wet tensile strength were measured. The following results were obtained:

| Example | | Percent impregnation | Percent resorcinol formaldehyde resin | Delam. resist., oz. | Wet tensile, lb. |
|---|---|---|---|---|---|
| Control XIV | A | 82 | 0 | 39 | 2.6 |
| Control XV | | 45 | 0 | 19 | 2.3 |
| Invention XVI | B | 62 | 15 | 42 | 12 |
| Invention XVII | | 40 | 15 | 29 | 10 |

In the following examples the backing treated is a 30-lb. semi-bleached creped kraft saturating grade paper. The impregnated papers were heat treated for 5 minutes at 320° F.

Latex C is, by weight, 43.75% butyl acrylate, 43.75% vinyl acetate and 12.5% acrylic acid. It was prepared as follows:

Using the same general precedure as above 150 ml. of distilled water containing 12 g. of 28% Triton X–200 emulsifying agent was heated to 60° under nitrogen. At this time 0.5 g. portions of potassium persulfate and sodium bisulfite were added and a monomer mixture of 35 ml. vinyl acetate, 35 ml. washed butyl acrylate, and 10 ml. distilled acrylic acid were allowed to start dropping in. After 30 minutes the addition of monomer was complete and another 0.5 g. portion of each of the redox components was added. Two more 0.5 g. portions of each initiator were added 30 and 60 minutes later and then the reaction was continued for an additional five hours. The polymeric latex was found to contain 23.3% solids after steam distillation.

Latex D is an impregnating composition based on latex C modified in accordance with this invention. Latex D contains 95 parts by weight of latex C plus 5 parts by weight (based on solids content) of a water soluble phenol-formaldehyde resin.

The compositions of latex C and latex D were used to impregnate the creped paper described in various degrees. The delamination resistance and wet tensile strength were measured. The following results were obtained.

| Example | | Percent impregnation | Percent phenol formaldehyde resin | Delam. resist., oz. | Wet tensile strength, lbs. |
|---|---|---|---|---|---|
| Control XVIII | C | 76 | 0 | 31 | 3.6 |
| Control XIX | | 59 | 0 | 30 | 4.2 |
| Invention XX | D | 63 | 5 | 34 | 9.5 |
| Invention XXI | | 45 | 5 | 30 | 9.4 |

It will be noted that equivalent physical characteristics are obtained at a much lower level of impregnation when an aldehyde resin is included in the impregnating composition.

Applicant has set forth the preferred embodiments of his invention but wishes to point out that where edge tear characteristics are not of particular importance, modifying resins may be included in impregnating compositions of this invention in amounts up to about 25%, with continued improvement in delamination resistance and wet tensile strength. Beyond 25% improvement in these factors is too slight to warrant further addition of the modifying resin.

Reference is now made to the accompanying drawing which shows in cross section a tape prepared in accordance with the present invention. The tape comprises a unified backing 1 formed in accordance with the teachings of this invention and having on one side a coat 2 of a normally tacky and pressure-sensitive adhesive.

The invention in its broader aspects is not limited to the specific steps, methods, compositions and improvements shown and described herein, but departures may be made within the scope of the accompanying claims without departing from the principles of the invention and without sacrificing its chief advantages.

What is claimed is:

1. A unified paper sheet having good edge tear, flexibility, elongation, tensile strength and delamination resistance, which comprises a paper web internally bonded with a unifying impregnant composition comprising a mixed aqueous suspension of a copolymer of an acrylic ester and a copolymerizable monomer in an amount from about 2 to 13.5% by weight of the copolymer selected from the group consisting of acrylic acids, acrylamides, vinyl pyridines, dialkyl amino alkyl acrylates, glycidyl alkyl acrylates and allyl substituted melamines, and a water-dispersible modifying aldehyde resin, in an amount by weight of the total impregnant composition of 25 to 0.1%, selected from the group consisting of water-dispersible phenol-formaldehyde, urea-formaldehyde and melamine-formaldehyde resins.

2. A unified paper sheet according to claim 1, wherein there is included a butadiene-styrene copolymer in an amount up to 75% by weight of the total impregnant composition.

3. A unified paper sheet according to claim 1, wherein the modifying resin is a water-dispersible phenol-formaldehyde resin in an amount from about 10 to 0.5% by weight of the total impregnant composition.

4. A unified paper sheet according to claim 1, wherein the modifying resin is a water-dispersible urea-formaldehyde resin in an amount from about 8 to 1% by weight of the total impregnant composition.

5. A unified paper sheet according to claim 1, wherein the modifying resin is a water-dispersible melamine-formaldehyde resin in an amount from about 8 to 1% by weight of the total impregnant composition.

6. A paper-backed normally tacky and pressure-sensitive adhesive tape having good edge tear, flexibility, elongation, tensile strength and delamination resistance, comprising a unified paper sheet internally bonded with a unifying impregnant composition comprising a mixed aqueous suspension of a copolymer of an acrylic ester and a copolymerizable monomer in an amount from about 2 to 13.5% by weight of the copolymer selected from the group consisting of acrylic acids, acrylamides, vinyl pyridines, dialkyl amino alkyl acrylates, glycidyl alkyl acrylates and allyl substituted melamines, and a water-dispersible modifying resin, in an amount by weight of the total impregnant composition of 25 to 0.1%, selected from the group consisting of water-dispersible phenol-formaldehyde, urea-formaldehyde, melamine-formaldehyde resins, and a coating of a normally tacky and pressure-sensitive adhesive on at least one major surface of said paper backing.

7. A normally tacky and pressure-sensitive adhesive tape according to claim 6, wherein there is included a butadiene-styrene copolymer in an amount up to 75% by weight of the total impregnant composition.

8. A normally tacky and pressure-sensitive adhesive tape according to claim 6, wherein the modifying resin is a water-dispersible phenol-formaldehyde resin in an amount from about 10 to 0.5% by weight of the total impregnant composition.

9. A normally tacky and pressure-sensitive adhesive tape according to claim 6, wherein the modifying resin is a water-dispersible urea-formaldehyde resin in an amount from about 8 to 1% by weight of the total impregnant composition.

10. A normally tacky and pressure-sensitive adhesive tape according to claim 6, wherein the modifying resin is a water-dispersible melamine-formaldehyde resin in an amount from about 8 to 1% by weight of the total impregnant composition.

References Cited in the file of this patent

UNITED STATES PATENTS

| | | |
|---|---|---|
| 2,536,050 | Fluck | Jan. 2, 1951 |
| 2,767,152 | Bierman et al. | Oct. 16, 1956 |
| 2,823,142 | Summer et al. | Feb. 11, 1958 |
| 2,848,105 | Bartell et al. | Aug. 19, 1958 |
| 2,884,342 | Wolff | Apr. 28, 1959 |
| 2,961,348 | Finnegan et al. | Nov. 22, 1960 |

UNITED STATES PATENT OFFICE
CERTIFICATE OF CORRECTION

Patent No. 3,068,121                      December 11, 1962

Joseph R. Weschler

It is hereby certified that error appears in the above numbered patent requiring correction and that the said Letters Patent should read as corrected below.

Column 2, line 60, for "0-5%" read -- 0-50% --; column 4, line 21, after "acrylate" insert -- latex --; column 5, line 28, for "graft" read -- kraft --.

Signed and sealed this 6th day of August 1963.

(SEAL)
Attest:

ERNEST W. SWIDER                      DAVID L. LADD
Attesting Officer                       Commissioner of Patents